Dec. 20, 1960  A. G. FELDMANN ET AL  2,965,143
INSERTED TOOTH SAW BLADE
Filed April 27, 1959
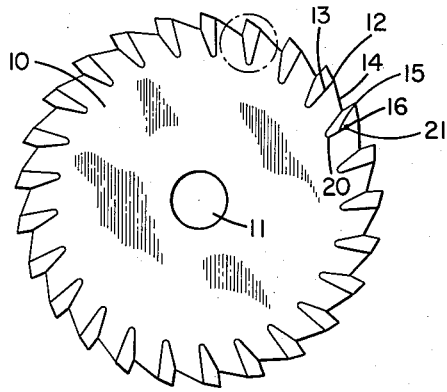
Fig. 1
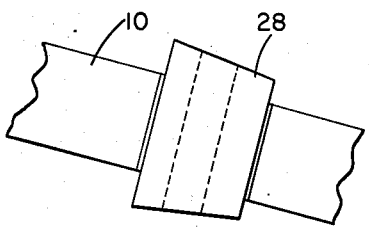
Fig. 4
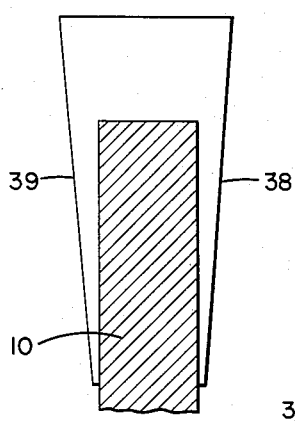
Fig. 3
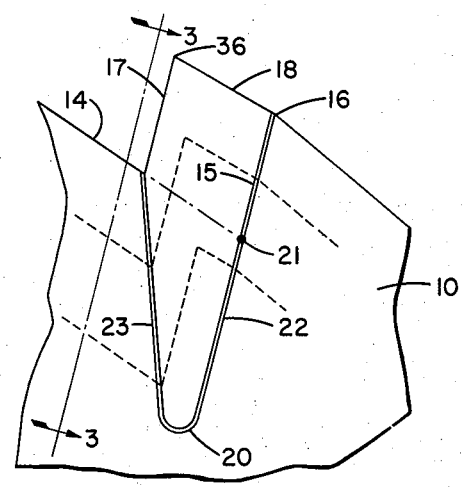
Fig. 2
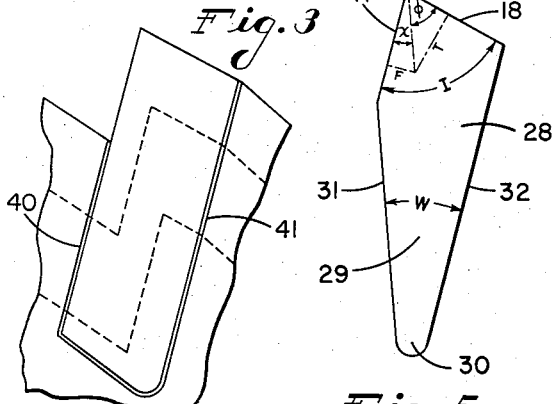
Fig. 6 PRIOR ART
Fig. 5
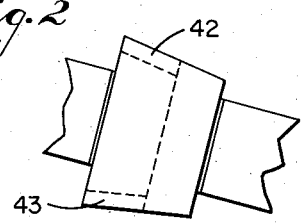
Fig. 7 PRIOR ART
INVENTOR.
ALFRED G. FELDMANN
ROBERT M. SCHULTZ
BY
ATTORNEY United States Patent Office 2,965,143
Patented Dec. 20, 1960

2,965,143

INSERTED TOOTH SAW BLADE

Alfred G. Feldmann, Clifton, and Robert M. Schultz, Oradell, N.J., assignors to Deluxe Service Tool Corporation, North Bergen, N.J., a corporation of New Jersey Filed Apr. 27, 1959, Ser. No. 809,198

2 Claims. (Cl. 143—133)

The present invention relates to circular saw blades and more particularly to so-called inserted tooth circular saw blades.

A major problem with inserted tooth circular saw blades having deeply set teeth with shallow gullet depths is the inability to repeatedly sharpen the teeth and still maintain the original tooth shape, original gullet depth, original front face length, and original cutting angles to thus maintain original cutting efficiency.

It is a principal object of the present invention to provide an improved inserted tooth circular saw blade having deeply set teeth.

Another important object of the invention is to provide an inserted tooth circular saw blade having deeply set teeth so arranged as to permit repeated sharpening of the teeth without changing any factors such as gullet depth, tooth shape, cutting angles and the like that would tend to reduce the cutting efficiency of the saw blade.

Yet another object of the invention is to provide an improved inserted tooth circular saw blade having deeply set cutting teeth to minimize tooth breakage but so arranged that the cutting efficiency is not impaired by repeated sharpening of the teeth.

A feature of the invention is the provision of a circular saw blade disk body comprising a plurality of peripheral projections each having a leading edge extending generally radially inwardly from the peripheral tip of the projection together with a trailing edge or gullet extending inwardly toward the inner end of the next adjacent leading edge of a succeeding projection. A wedge-shaped saw tooth receiving pocket is formed at the intersection of the inner ends of each trailing and leading edge and extends toward the center of the saw body with its apex of the pocket at a depth at least greater than the length of exposed leading edge corresponding to the length of exposed leading edge of tooth to be inserted. According to the invention, the wedge-shaped pocket is formed with its apex defining an acute angle and one side wall of the pocket may be an extension of the leading edge of each projection.

Further objects, features, and the attending advantages of the invention will be apparent with reference to the following specification and drawing in which:

Fig. 1 is a front elevational view of the inserted tooth circular saw blade of the invention;

Fig. 2 is an enlarged fragmentary elevational view of the portion of the blade enclosed by the dotted-line circle of Fig. 1;

Fig. 3 is a sectional view taken on the line 3—3 of Fig. 2;

Fig. 4 is a top plan view of the fragmentary elevational view of Fig. 2;

Fig. 5 is a side elevational view of a tooth insert with certain geometrical legends added;

Fig. 6 is an enlarged fragmentary elevational view of a portion of a blade having a conventional deep-set tooth insert according to the prior art; and Fig. 7 is a top plan view of the fragmentary elevational view of Fig. 6.

Referring to Figs. 1 through 5 of the drawing, the circular saw disk body 10 is provided with a conventional axial bore 11 for attachment to the rotatable shaft of a power source (not shown). Around the periphery of the saw body are disposed a plurality of projections such as the projection 12 having a leading edge 13 extending generally radially inwardly and a trailing edge or gullet 14 extending inwardly toward the inner end of the leading edge 15 of a next adjacent projection 16. A generally wedge-shaped tooth insert-receiving pocket is formed at the junction of inner ends of each trailing edge with the next adjacent leading edge and extends radially inwardly with its apex 20 at a depth beneath the trailing edge or gullet 14 that is at least greater than the length of the exposed leading edge between points 21 and 16 for example, corresponding to the exposed leading edge 17 of a cutting tooth when inserted. One side wall 22 of the wedge-shaped pocket may be an extension of the leading edge of the projection such as shown between the apex 20 and the point 21. The other side wall 23 of the wedge-shaped tooth-receiving pocket extends to the junction with the trailing edge or gullet 14 from the apex 20 at an acute angle not greater than 45° with respect to the side wall 22.

An example of a typical tooth insert is shown by Fig. 5 of the drawing and it will be seen that the tooth 28 is provided with a shank portion 29 of complementary wedge shape to the wedge-shaped tooth pocket of the saw blade. The apex 30 of the tooth is formed to include the acute angle W between the shank sides 31 and 32. The tooth shank side 31 is of a length corresponding to the length of pocket side wall 23 extending to the junction with the trailing edge or gullet 14 of the next adjacent blade peripheral projection while the shank side 32 is of a length corresponding to the total length of pocket side wall 22 and leading edge 15 extending to the apex of the blade projection 16. Tooth cutting edges are formed by the tooth side walls 17 and 18 with the cutting point at 36. As is more clearly shown by Fig. 3 of the drawings, the side edge walls 38 and 39 of each tooth may be tapered outwardly and may be wider than the thickness of the saw blade 10 in order to provide adequate cutting clearances for the saw blade. Also, as shown by Fig. 4, the side walls of the tooth 28 are tapered towards the saw body opposite to the direction of rotation of the saw blade. Of course, the invention is not limited to such width and arrangement of the tooth body relative to the thickness of the saw blade 10.

Each tooth 28 is secured in a respective tooth-receiving pocket of the saw blade 10 by any suitable means such as silver solder, brazing, high strength adhesive or cement. Also, it should be understood that each tooth is formed of any suitable material which may or may not be harder than the metal of the saw blade 10. For example, each tooth 28 may be formed of a cemented carbide such as tungsten carbide, titanium carbide, tantalum carbide, columbium carbide or the like.

Now, considering the saw blade of the invention with cutting teeth inserted, it will be seen by the dotted lines of Figs. 2 and 4 that repeated sharpening of the teeth by grinding down the top edge, the cutting leading edge of each tooth and the gullet between, does not change the length of exposed leading cutting edge of each tooth, the gullet depth, the side shape of the teeth, or the cutting angles at the tip of each tooth. Figs. 6 and 7 of the drawing show a conventional deep-set tooth insert with the changes in tooth shape after repeated sharpening indicated by the dotted lines. As shown, in the conventional prior art type of inserted tooth having the straight sides 40 and 41 not forming an acute wedge angle with each other, a zone of interference or irregular shape at 42 and 43 will develop on the sides of the teeth as they are progressively sharpened. According to the present invention, the acute angle between the tooth side walls 22, 23 is determined in relation to the sharpening ratio, i.e., the amount of metal to be removed from the top face 18 over the amount of metal to be removed from the front face 17 of the tooth such that the locus of intersection of the gullet 14 with the front face 17 is always at the wedge line defined by the pocket side wall 23 so that no zone of interference can be developed as shown by the dotted lines of Fig. 4. Furthermore, the relatively deep wedge-shaped pocket for the similarly wedge-shaped shank of each tooth is not changed by repeated sharpening procedures and the greater strength of saw blade and inserted tooth arrangement of the invention thus provided is not affected. Thus, the acute angle, preferably not greater than 45°, at the apex of the shank of the cutting tooth and the apex of the cutting tooth pocket is an important feature of the invention contributing to the strength of the saw blade and teeth assembly and in one example of the invention the apex angle may be in the order of eighteen degrees. Also, the generally radial extension inwardly of the leading edge for each projection of the saw body 10 may be along an exact radius line with reference to the axis 11 of the saw blade disk 10 or it may be along a line at an angle up to plus or minus twenty degrees with relation to a radial line intersecting the axis 11. Of course, as shown, the leading exposed cutting edge 17 of each tooth may extend along a line generally parallel to the leading edge 15 of each blade projection which may extend generally radially as previously described.

Although it has been previously mentioned that one example of cutting tooth shank would comprise an acute apex angle of about eighteen degrees, the normal range of acute angle may be from twelve degrees to twenty-five degrees and in any use the following mathematical formula may be used for determining the degree of the acute apex angle W not exceeding forty-five degrees (Fig. 5) for any particular embodiment of the invention. The various geometrical factors in the following formula are indicated by corresponding geometric legends on Figure 5 of the drawing.

Considering that T is the amount of metal to be removed from the top 18 of the tooth and F is the amount of metal to be removed from the front face 17 of the tooth when sharpening, then, by definition:

(1) $\quad \frac{T}{F} = S \quad$ Sharpening ratio (A constant, which under present normal sharpening procedures may equal about 2.5 for a wedge angle of about 18°.)

(2) $\quad \frac{T}{\sin \phi} = L \quad$ also $\quad \frac{F}{\sin \chi} = L$ (3) $\quad \therefore \frac{T}{\sin \phi} = \frac{F}{\sin \chi} \quad$ and (4) $\quad \frac{T}{F} = \frac{\sin \phi}{\sin \chi}$ (5) $\quad \phi = I - \chi$ (6) $\quad \frac{T}{F} = \frac{\sin (I-\chi)}{\sin \chi} = \frac{\sin I \cos \chi - \cos I \sin \chi}{\sin \chi}$ (7) $\quad \frac{\sin I \cos \chi - \cos I \sin \chi}{\sin \chi} = S$ (8) $\quad \sin I \cos \chi - \cos I \sin \chi = S \sin \chi$ Dividing by $\sin \chi$ (9) $\quad \sin I \cot \chi - \cos I = S$

(10) $\quad \sin I \cot \chi = S + \cos I$

(11) $\quad \cot \chi = \frac{S + \cos I}{\sin I}$

(12) $\quad \chi = \cot^{-1} \frac{S + \cos I}{\sin I} \quad \therefore$ since $\chi = W$ (by geometry)

(13) $\quad W = \cot^{-1} \frac{S + \cos I}{\sin I}$

From the above formula, if the sharpening ratio S is changed, then the wedge angle W will be changed accordingly.

Although a preferred form of the invention has been specifically described, it should be understood that various modifications will occur to those skilled in the art and will be included in the scope of the following claims.

What is claimed is:

1. An inserted tooth circular saw blade comprising, a disk body member provided with a plurality of peripheral projections each having a leading edge extending inwardly generally radially of the body and a trailing edge forming a gullet extending inwardly of the periphery of the body toward the inner end of the leading edge of the next adjacent projection, a wedge-shaped tooth-receiving pocket formed at the inner junction of each trailing edge and an adjacent leading edge with one pocket side wall formed by an inward extension of the associated leading edge and with its apex extending inwardly of the body to a depth at least greater than the length of the leading edge of tooth insert to be exposed above the gullet, and a plurality of tooth inserts each having a wedge-shaped shank secured in a respective one of each of said wedge-shaped pockets with respective cutting tooth edges extending beyond the outer peripheral ends of the projections of the disk body.

2. An inserted tooth circular saw blade comprising, a disk body member provided with a plurality of peripheral projections each having a leading edge extending inwardly within 20° of a radial of the body and a trailing edge forming a gullet extending inwardly of the periphery of the body toward the inner end of the leading edge of the next adjacent projection, a wedge-shaped tooth-receiving pocket formed at the inner junction of each trailing edge and an adjacent leading edge with one pocket side wall formed by an inward extension of the associated leading edge and with its apex extending inwardly of the body to a depth at least greater than the length of the leading edge of tooth insert to be exposed above the gullet, and a plurality of tooth inserts each having a wedge-shaped shank secured in a respective one of each of said wedge-shaped pockets with respective cutting tooth edges extending beyond the outer peripheral ends of the projections of the disk body.

References Cited in the file of this patent

UNITED STATES PATENTS

| | | |
|---|---|---|
| 1,837,344 | Stauder | Dec. 22, 1931 |
| 1,861,218 | Huther | May 31, 1932 |
| 2,528,226 | Hildebrant | Oct. 31, 1950 |
| 2,600,272 | Segal | June 10, 1952 |
| 2,659,397 | Drake | Nov. 17, 1953 |